(12) United States Patent
Tsai

(10) Patent No.: US 8,085,030 B2
(45) Date of Patent: Dec. 27, 2011

(54) VOLTAGE GENERATOR HAVING A DYNAMIC RESISTORS FEEDBACK CONTROL

(75) Inventor: Tzung-Shing Tsai, Taipei County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 423 days.

(21) Appl. No.: 12/124,130

(22) Filed: May 20, 2008

(65) Prior Publication Data
US 2009/0230942 A1    Sep. 17, 2009

(30) Foreign Application Priority Data
Mar. 11, 2008    (TW) ................ 97108505 A

(51) Int. Cl.
*H02J 1/00*    (2006.01)
*G05F 1/12*    (2006.01)
(52) U.S. Cl. .................. 323/318; 323/297
(58) Field of Classification Search .......... 323/225, 323/234, 271, 297, 318; 327/536
See application file for complete search history.

(56) References Cited

U.S. PATENT DOCUMENTS

| | | | | |
|---|---|---|---|---|
| 4,173,734 A * | 11/1979 | Hirasawa et al. | ............. | 323/225 |
| 6,927,620 B2 | 8/2005 | Senda | | |
| 7,272,047 B2 | 9/2007 | Chae | | |
| 7,728,563 B2 * | 6/2010 | Van Tran et al. | ............. | 323/222 |
| 7,737,765 B2 * | 6/2010 | Tran et al. | ............. | 327/536 |
| 2003/0111988 A1 | 6/2003 | Sundaram | | |
| 2008/0024096 A1 * | 1/2008 | Pan | ............. | 323/271 |
| 2008/0297231 A1 * | 12/2008 | Riedel | ............. | 327/536 |

FOREIGN PATENT DOCUMENTS

| | | |
|---|---|---|
| CN | 1606825 A | 4/2005 |
| TW | 200746585 | 12/2007 |

* cited by examiner

*Primary Examiner* — Adolf Berhane
(74) *Attorney, Agent, or Firm* — Winston Hsu; Scott Margo

(57) ABSTRACT

A voltage generator includes a charge pump, a voltage dividing circuit, and a comparator. The charge pump can output a high voltage. The dividing circuit includes a plurality of resistors and at least one switch. The dividing circuit can generate a first divided voltage of the high voltage when the switch is turned on and a second divided voltage of the high voltage when the switch is turned off. An output signal of the comparator can control the switch and the charge pump. The dividing circuit and the comparator form a feedback loop so that the response speed of the comparator can be increased and the ripples of the high voltage outputted from the charge pump can be decreased.

16 Claims, 11 Drawing Sheets

US 8,085,030 B2

VOLTAGE GENERATOR HAVING A DYNAMIC RESISTORS FEEDBACK CONTROL

BACKGROUND OF THE INVENTION

1. Field of the Invention

The present invention relates to a voltage generator, and more particularly, to a voltage generator having a dynamic resistors feedback control.

2. Description of the Prior Art

Please refer to FIG. 1. FIG. 1 is a schematic diagram of a voltage generator according to the prior art. The voltage generator 10 comprises a charge pump 12, a voltage dividing circuit 14, and a comparator 16. The charge pump 12 is used for outputting a high voltage Vout and generating a divided voltage Vdiv of the high voltage Vout by the voltage dividing circuit 14. The comparator 16 outputs an enabling signal EN according to the divided voltage Vdiv and a reference voltage Vref. The voltage dividing circuit 14 and the comparator 16 form a feedback loop. The charge pump 12 outputs the high voltage Vout according to the enabling signal EN. The voltage dividing circuit 14 comprises a first resistor 17, a second resistor 18, and a third resistor 19. A first end of the first resistor 17 is coupled to a first node A. A first end of the second resistor 18 is coupled to a second end of the first resistor 17. A second end of the second resistor 18 is coupled to a second node B. A first end of the third resistor 19 is coupled to the second node B. A second end of the third resistor 19 is coupled to a third node C. The first node A is coupled to an output end of the charge pump 12. The second node B is coupled to a first input end of the comparator 16. The third node C is coupled to a ground end. The voltage of the first node is the high voltage Vout, and the voltage of the second node is the divided voltage Vdiv.

Please refer to FIG. 2. FIG. 2 is a waveform diagram of the high voltage Vout and the divided voltage Vdiv in FIG. 1. The feedback loop formed by the voltage dividing circuit 14 and the comparator 16 can limit the charge pump 12 to output the high voltage Vout close to a target level Vtar. When the high voltage Vout outputted from the charge pump 12 rises to the target level Vtar, the feedback loop can turn off the charge pump 12. The charge pump 12 will be turned on until the high voltage Vout is under the target level Vtar. Thus, the comparator 16 compares the divided voltage Vdiv with an upper level and a lower level of a reference voltage Vref respectively. When the divided voltage Vdiv is over the upper level of the reference voltage Vref, the comparator 16 outputs the enabling signal EN, turning off the charge pump 12. When the divided voltage Vdiv is under the lower level of the reference voltage Vref, the comparator 16 outputs the enabling signal EN, turning on the charge pump 12. Since the comparator 16 has a delay time, the feedback loop will make ripples on the output voltage of the charge pump 12.

In conclusion, a high voltage generator utilizes a voltage dividing circuit and a comparator to form a feedback loop. The feedback loop can control the charge pump so that the charge pump is turned off when the output high voltage rises to a target level. The charge pump is turned on until the high voltage is under the target level. The feedback loop can limit the output voltage of the charge pump, but make ripples in the output voltage. Big ripples may result in the output voltage being unstable and may also generate noise.

SUMMARY OF THE INVENTION

According to an embodiment of the present invention, a voltage generator having a dynamic resistors feedback control comprises a charge pump, a dividing circuit, and a comparator. The charge pump outputs a high voltage. The dividing circuit is coupled to an output end of the charge pump and comprises a plurality of resistors and at least one switch, for generating a first divided voltage of the high voltage when the switch is turned on, and a second divided voltage of the high voltage when the switch is turned off. The comparator comprises a first input end coupled to the dividing circuit, a second input end for inputting a reference voltage, and an output end coupled to the charge pump.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
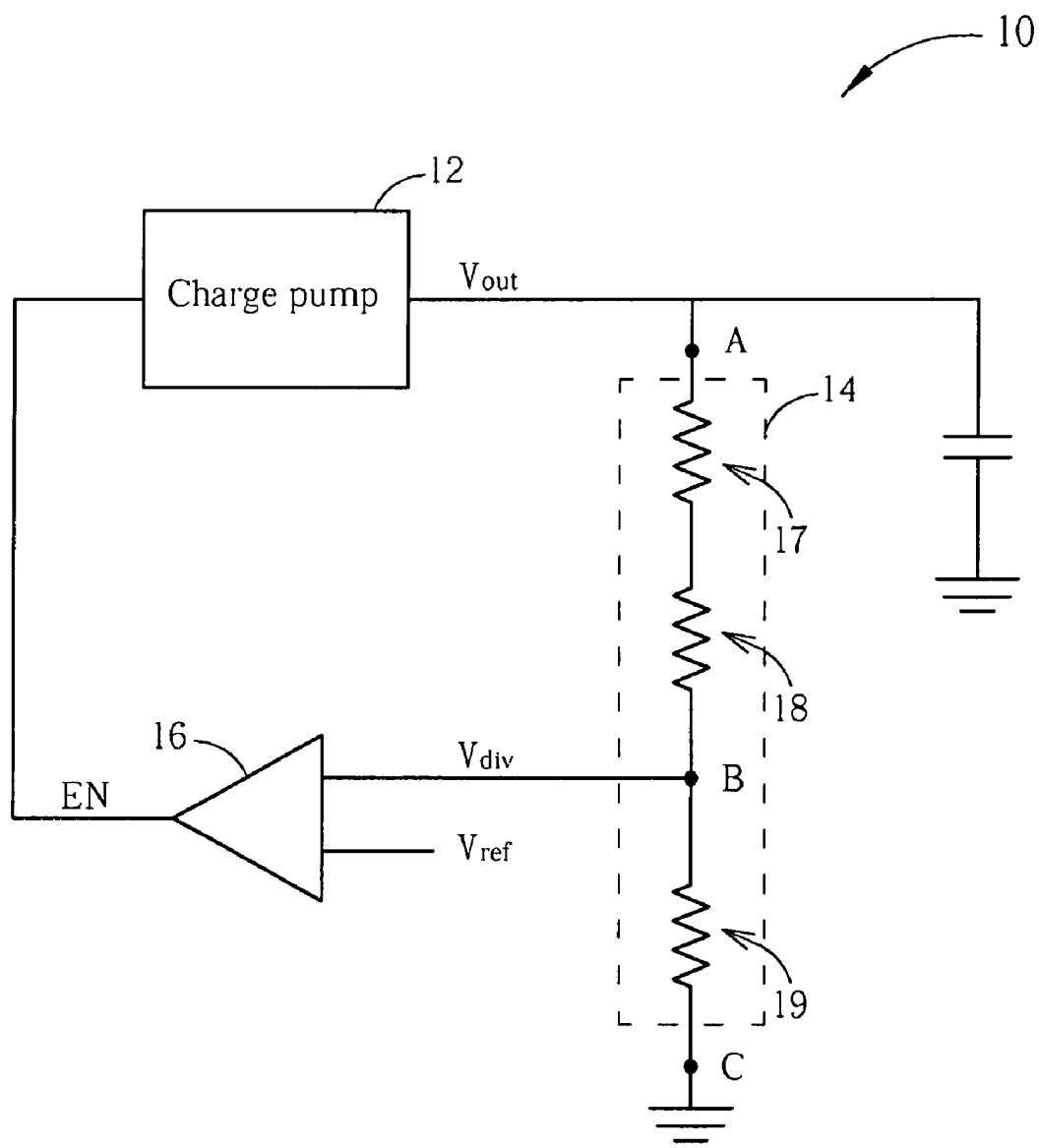
FIG. 1 is a schematic diagram of a voltage generator according to the prior art.
Figure 2:
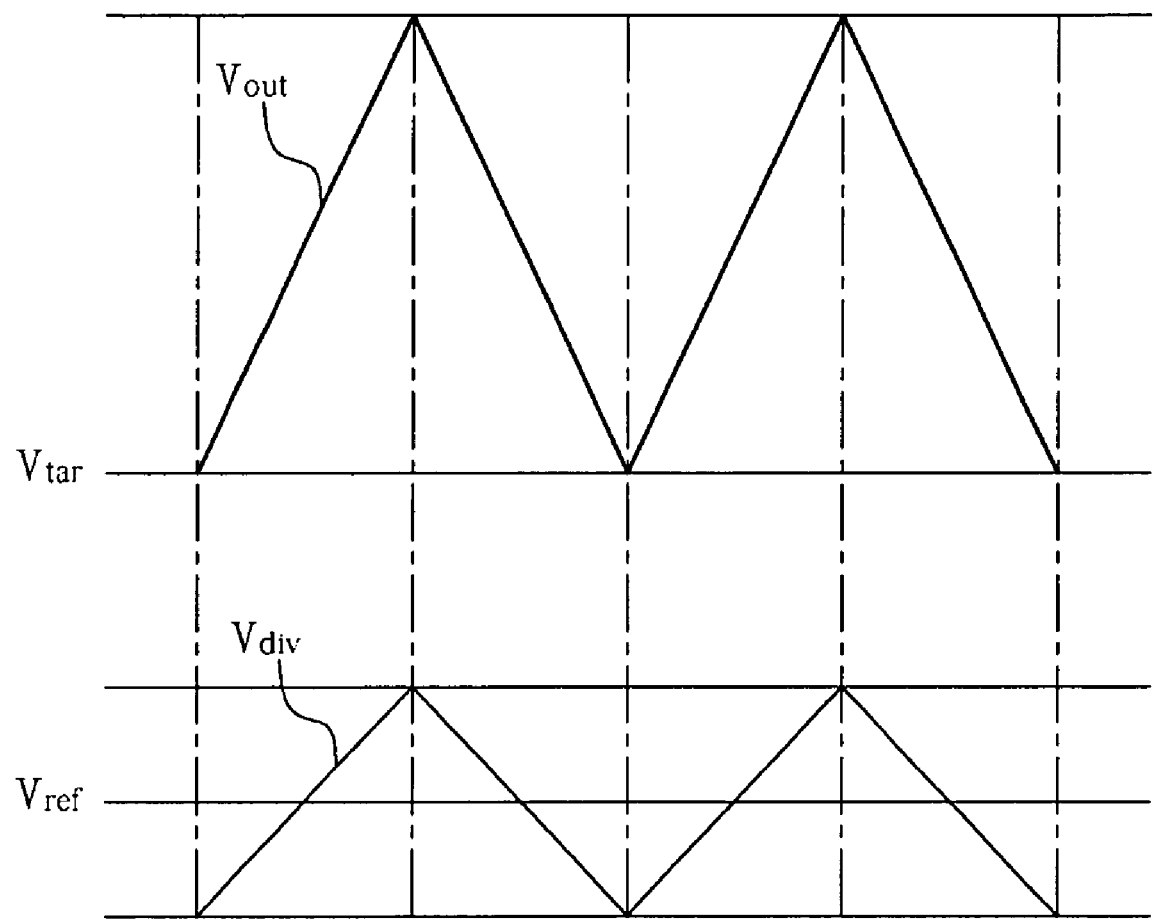
FIG. 2 is a waveform diagram of the high voltage Vout and the divided voltage Vdiv in FIG. 1.
Figure 3:
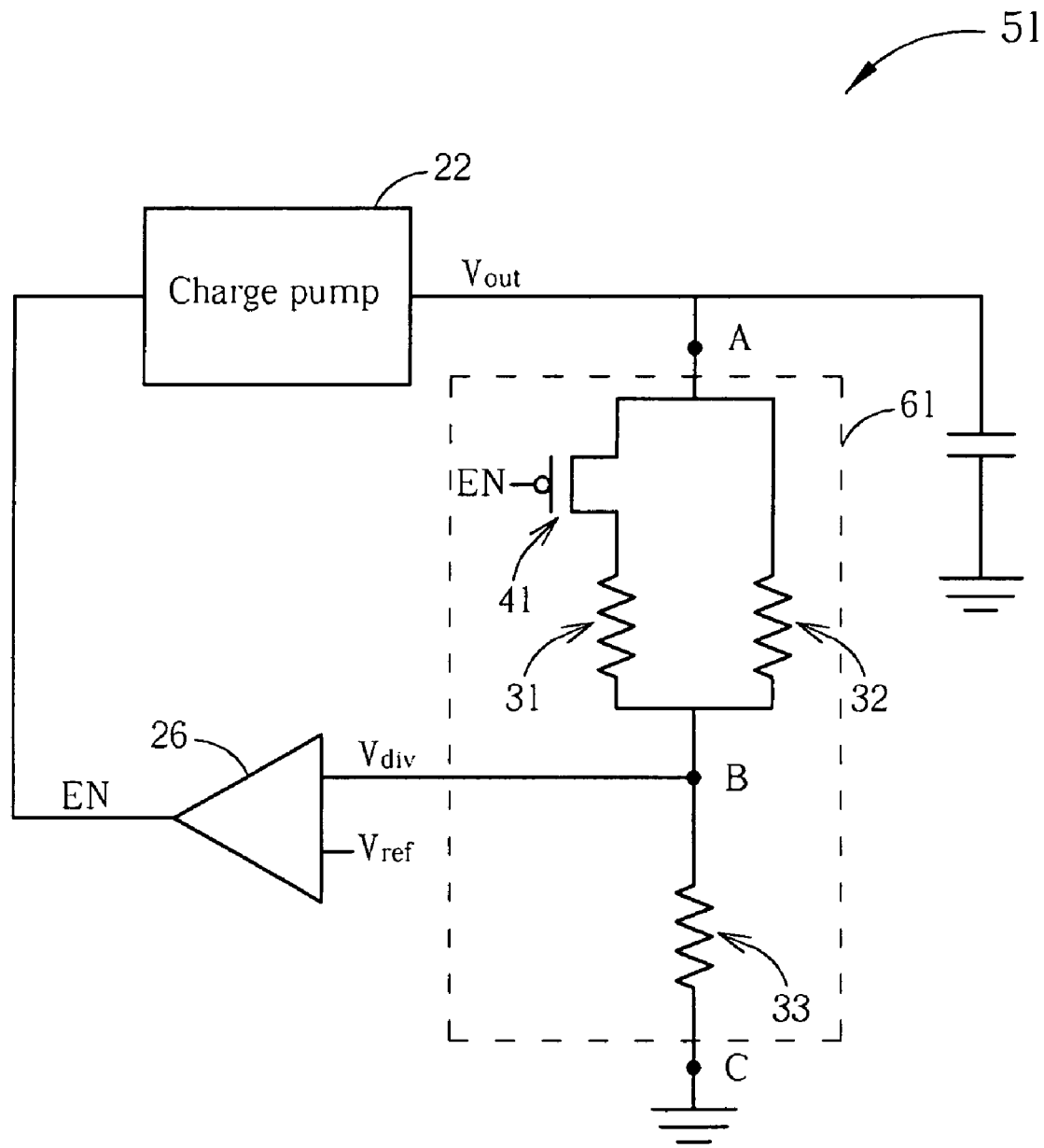
FIG. 3 is a schematic diagram of the first embodiment of the voltage generator according to the present invention.

Please refer to FIG. 3. FIG. 3 is a schematic diagram of the first embodiment of the voltage generator according to the present invention. The voltage generator 20 comprises a charge pump 22, a voltage dividing circuit 61, and a comparator 26. The charge pump 22 is used for outputting a high voltage Vout and generating a divided voltage Vdiv of the high voltage Vout by the voltage dividing circuit 61. The comparator 26 outputs an enabling signal EN according to the divided voltage Vdiv and a reference voltage Vref. The voltage dividing circuit 61 and the comparator 26 form a feedback loop so that the charge pump 22 can adjust the high voltage Vout according to the enabling signal EN. The voltage dividing circuit 61 comprises a first resistor 31, a second resistor 32, a third resistor 33, and a first switch 41. The first resistor 31 is coupled between the first switch 41 and a second node B. The second resistor 32 is coupled between a first node A and the second node B. The third resistor 33 is coupled between the second node B and a third node C. The first switch 41 is coupled between the first node A and the first resistor 31, and the first resistor 31 and the first switch 41 can be interchanged. The first node A is coupled to an output end of the charge pump 22. The second node B is coupled to a first input end of the comparator 26. The third node C is coupled to a ground end. The voltage dividing circuit 61 can generate different voltage values when the first switch 41 is turned on and turned off respectively. Assuming the resistances of the first resistor 31, second resistor 32, and third resistor 33 are R1, R2, and R3, respectively, when the first switch 41 is turned on, the divided voltage Vdiv of the second node B is R3*Vout/(R3+R1*R2/(R1+R2)). When the first switch 41 is turned off, the divided voltage Vdiv of the second node B is R3*Vout/(R2+R3).

Figure 4:
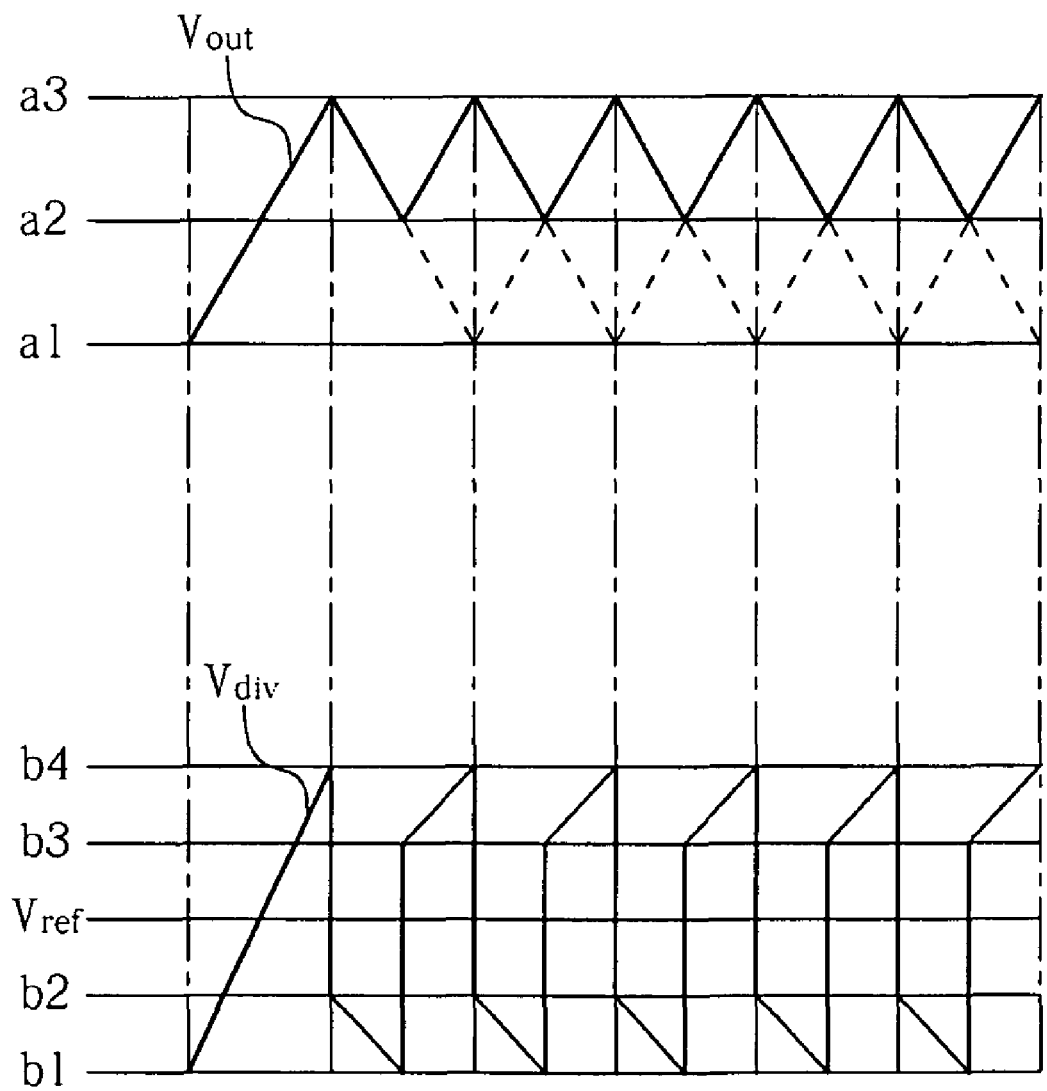
FIG. 4 is a waveform diagram of the high voltage Vout and the divided voltage Vdiv in FIG. 3.

Please refer to FIG. 4. FIG. 4 is a waveform diagram of the high voltage Vout and the divided voltage Vdiv in FIG. 3. When the high voltage Vout outputted from the charge pump 22 rises to a target level, the feedback loop formed by the voltage dividing circuit 61 and the comparator 26 can turn off the charge pump 22. The charge pump 22 is turned on until the high voltage Vout is under the target level. According to the mechanism above, since the comparator 26 has a delay time, the feedback loop will make ripples on the output voltage of the charge pump 22, and big ripples may result in the unstable output voltage and generate noises. Thus, according to the present invention, the voltage dividing circuit 61 can generate different voltage values according to the enabling signal EN so as to increase the response speed of the comparator 26 for decreasing the amplitude of the ripples. As shown in FIG. 4, the charge pump 22 outputs the high voltage Vout rising to the target level a1. When the switch 41 of the voltage dividing circuit 61 is not in action (always turned off), the ripples of the high voltage Vout are between the levels a1 and a3 (dotted line). When the high voltage Vout rises from the level a1 to the level a3, the divided voltage Vdiv also rises to the upper level b4 of the reference voltage Vref. When the divided voltage Vdiv is above the upper level b4 of the reference voltage Vref, the comparator 26 outputs the enabling signal EN, turning off the charge pump 22 and turning off the first switch 41, so that the divided voltage Vdiv will fall to the level b2 immediately. When the high voltage Vout falls to the level a2, the divided voltage Vdiv falls to the lower level b1 of the reference voltage Vref. When the divided voltage Vdiv is below the lower level b1 of the reference voltage Vref, the comparator 26 outputs the enabling signal EN, turning on the charge pump 22 and turning on the first switch 41, so that the divided voltage Vdiv will rise to the level b3 immediately. When the high voltage Vout rises to the level a3, the divided voltage Vdiv rises to the upper level b4 of the reference voltage Vref. Thus, the high voltage Vout outputted from the charge pump 22 is clamped between the levels a2 and a3. By operating the first switch 41 and the charge pump 22 synchronously, the response speed of the comparator 26 can be increased, so as to decrease the ripples of the high voltage Vout outputted from the charge pump 22.

When the path through the switch of the voltage dividing circuit 61 is not taken into account, the high voltage Vout has ripples of about 5V+−40 mV, and Vdiv=Vout/4. Thus, the upper level b4 of the reference voltage Vref is 1.26V, and the lower level b1 is 1.24V. In the first embodiment, when the first switch 41 is turned on, the voltage of the second node B is Vdiv=R3*Vout/((R1*R2/R1+R2)+R3)=Vout/3.98. When the switch is not in action, the practical Vout is about 1.24V*3.98=4.9352V~1.26V*3.98=5.0148V. When the first switch 41 is turned off, the voltage of the second node B is Vdiv=R3*Vout/(R2+R3)=Vout/4.02, and the practical Vout is about 1.24V*4.02=4.9848V~1.26V*4.02=5.0625V. When the first switch 41 is turned on, the high voltage Vout rises to 5.0148V, and the divided voltage Vdiv rises to 1.26V. When the divided voltage Vdiv is over 1.26V, the comparator 26 outputs the enabling signal EN, turning off the charge pump 22 and turning off the first switch 41, so that the divided voltage Vdiv will fall to 1.247V immediately. When the high voltage Vout falls to 4.9848V, the divided voltage Vdiv falls to 1.24V. When the divided voltage Vdiv is under 1.24V, the comparator 26 outputs the enabling signal EN turning on the charge pump 22 and turning on the first switch 41, so that the divided voltage Vdiv will rise to 1.252V immediately. When the high voltage Vout rises to 5.0148V, the divided voltage Vdiv rises to 1.26V. Thus, the ripples of the high voltage Vout are clamped between 4.9848V and 5.0148V, so the signal is about 5V+−15 mV.

Figure 5:
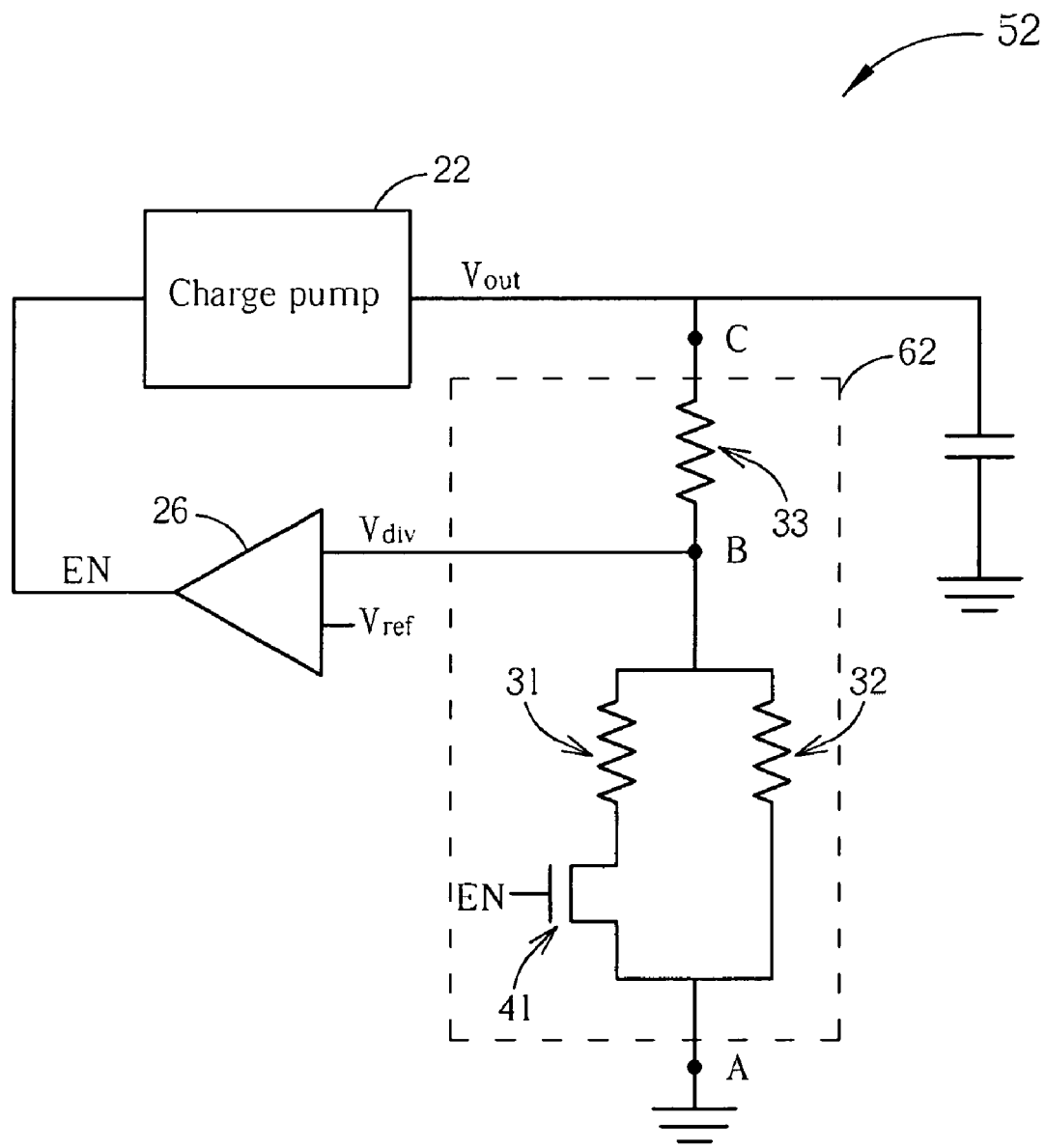
FIG. 5 is a schematic diagram of the second embodiment of the voltage generator according to the present invention.

Please refer to FIG. 5. FIG. 5 is a schematic diagram of the second embodiment of the voltage generator according to the present invention. In comparison to the first embodiment, for the voltage generator 52 in the second embodiment, the first node A is coupled to a ground end, the second node B is coupled to the first input end of the comparator 26, and the third node C is coupled to the output end of the charge pump 22. Assuming the resistances of the first resistor 31, second resistor 32, and third resistor 33 are R1, R2, and R3 respectively, when the first switch 41 is turned on, the voltage of the second node B is Vdiv=(R1*R2/(R1+R2))*Vout/(R3+R2*R1/(R1+R2)). When the first switch 41 is turned off, the voltage of second node B is Vdiv=(R2)*Vout/(R2+R3)).

When the path through the switch of the voltage dividing circuit 62 is not taken into consideration, the high voltage Vout has ripples about 5V+−40 mV and Vdiv=Vout/4. Thus, the upper level b4 of the reference voltage Vref is 1.26V, and the lower level b1 is 1.24V. In the first embodiment, when the first switch 41 is turned on, the voltage of the second node B is Vdiv=(R1*R2/(R1+R2))Vout/(R3+R2*R1/(R1+R2))=Vout/4.02. When the switch is not in action, the practical Vout is about 1.24V*4.02=4.9848V~1.26V*4.02=5.0625V. When the first switch 41 is turned off, the voltage of the second node B Vdiv=R3*Vout/(R2+R3)=Vout/3.98, and the practical Vout is about 1.24V*3.98=4.9352V~1.26V*3.98=5.0148V. When the first switch 41 is turned off, the high voltage Vout rises to 5.0148V, and the divided voltage Vdiv rises to 1.26V. When the divided voltage Vdiv is over 1.26V, the comparator 26 outputs the enabling signal EN, turning off the charge pump 22 and turning on the first switch 41, so that the divided voltage Vdiv will fall to 1.247V immediately. When the high voltage Vout falls to 4.9848V, the divided voltage Vdiv falls to 1.24V. When the divided voltage Vdiv is under 1.24V, the comparator 26 outputs the enabling signal EN, turning on the charge pump 22 and turning off the first switch 41, so that the divided voltage Vdiv rises to 1.252V immediately. When the high voltage Vout rises to 5.0148V, the divided voltage Vdiv rises to 1.26V. Thus, the ripples of the high voltage Vout are clamped between 4.9848V and 5.0148V, so the signal is about 5V+31 15 mV.

Figure 6:
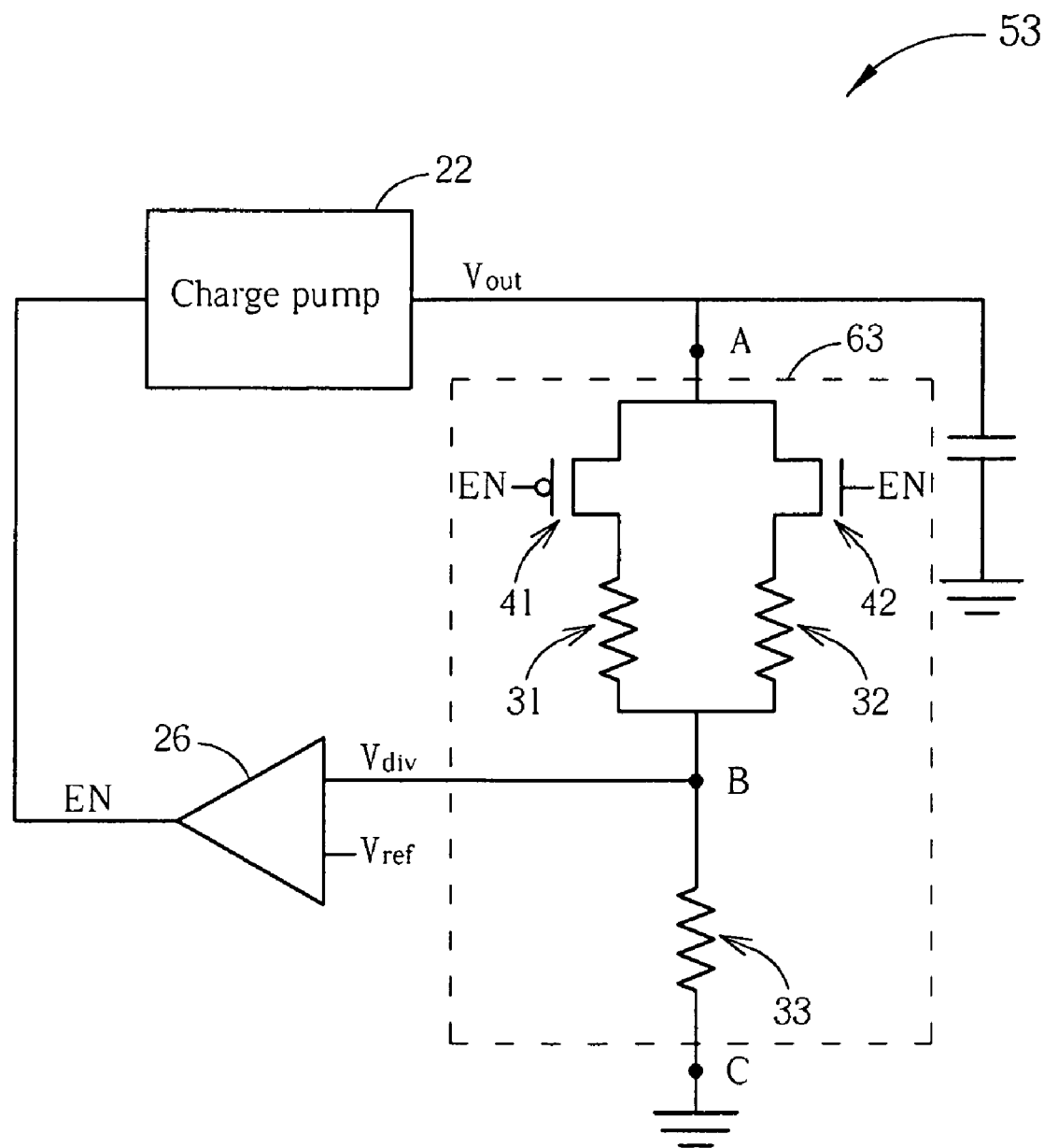
FIG. 6 is a schematic diagram of the third embodiment of the voltage generator according to the present invention.

Please refer to FIG. 6. FIG. 6 is a schematic diagram of the third embodiment of the voltage generator according to the present invention. In comparison to the first embodiment, the voltage dividing circuit 63 of the voltage generator 53 in the third embodiment further comprises a second switch 42. The second switch is coupled between the first node A and the second resistor 32. When the first switch 41 is turned on, the second switch 42 is turned off. When the first switch 41 is turned off, the second switch 42 is turned on. The voltage dividing circuit 63 in the third embodiment makes it easier to design two different divided voltages. Designing the divided voltages in the third embodiment to be the same as those in the first embodiment, for example, assuming the resistances of the first resistor 31, second resistor 32, and third resistor 33 are R1, R2, and R3, respectively, the voltage Vdiv is about R3*Vout/(R1+R3)=Vout/3.98>Vdiv>R3*Vout/(R3+R2)=Vout/4.02.

Figure 7:
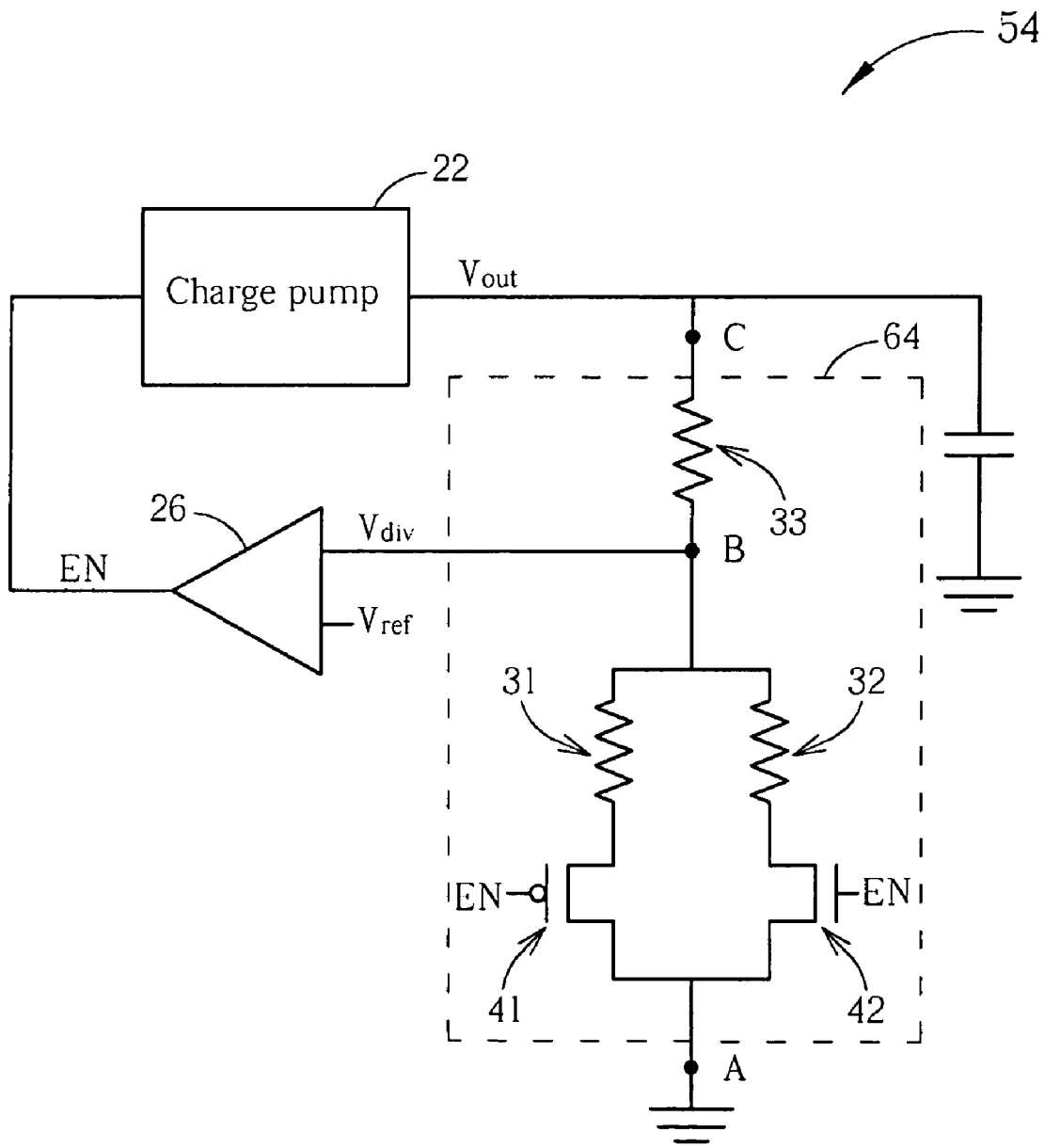
FIG. 7 is a schematic diagram of the fourth embodiment of the voltage generator according to the present invention.

Please refer to FIG. 7. FIG. 7 is a schematic diagram of the fourth embodiment of the voltage generator according to the present invention. In comparison to the third embodiment, for the voltage generator 54 in the fourth embodiment, the first node A is coupled to the ground end, the second node B is coupled to the first input end of the comparator 26, and the third node C is coupled to the output end of the charge pump 22.

Figure 8:
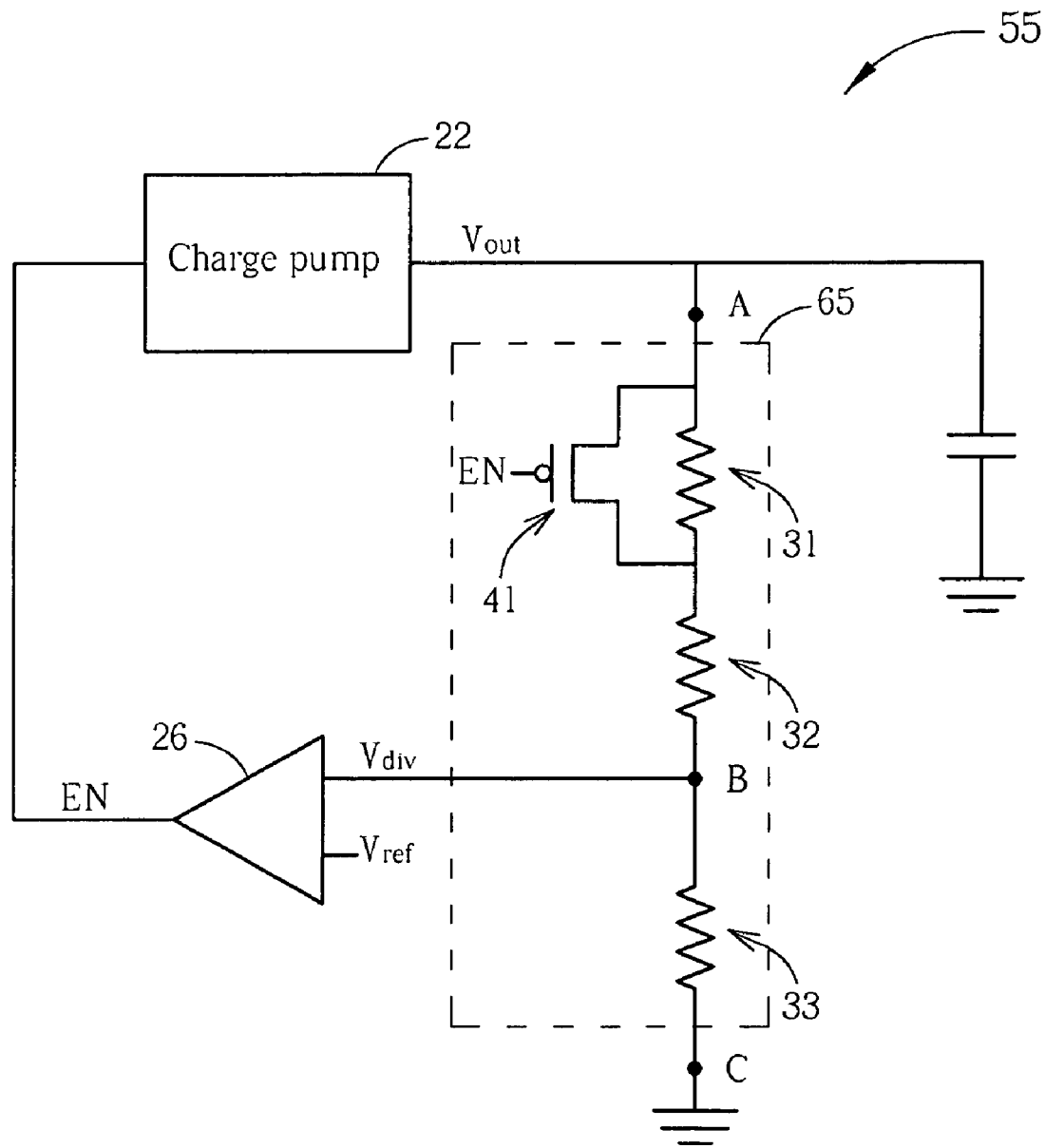
FIG. 8 is a schematic diagram of the fifth embodiment of the voltage generator according to the present invention.

Please refer to FIG. 8. FIG. 8 is a schematic diagram of the fifth embodiment of the voltage generator according to the present invention. From the first embodiment to the fourth embodiment, the resistors are coupled in parallel to implement two divided voltages. In the fifth embodiment, the voltage dividing circuit 65 implements two divided voltages by coupling the resistors in series. The first resistor 31 is coupled in series to the second resistor 32, and the series of the first resistor 31 and the second resistor 32 is coupled between the first node A and the second node B. The third resistor 33 is coupled between the second node B and the third node C. The first switch 41 is coupled in parallel to the first resistor 31. The first node A is coupled to the output end of the charge pump 22, the second node B is coupled to the first input end of the comparator 26, and the third node C is coupled to the ground end. Assuming the resistances of the first resistor 31, second resistor 32, and third resistor 33 are R1, R2, and R3, respectively, the voltage Vdiv is about R3*Vout/(R2)=Vout/3.98>Vdiv>R3*Vout/(R1+R2)=Vout/4.02.

Figure 9:
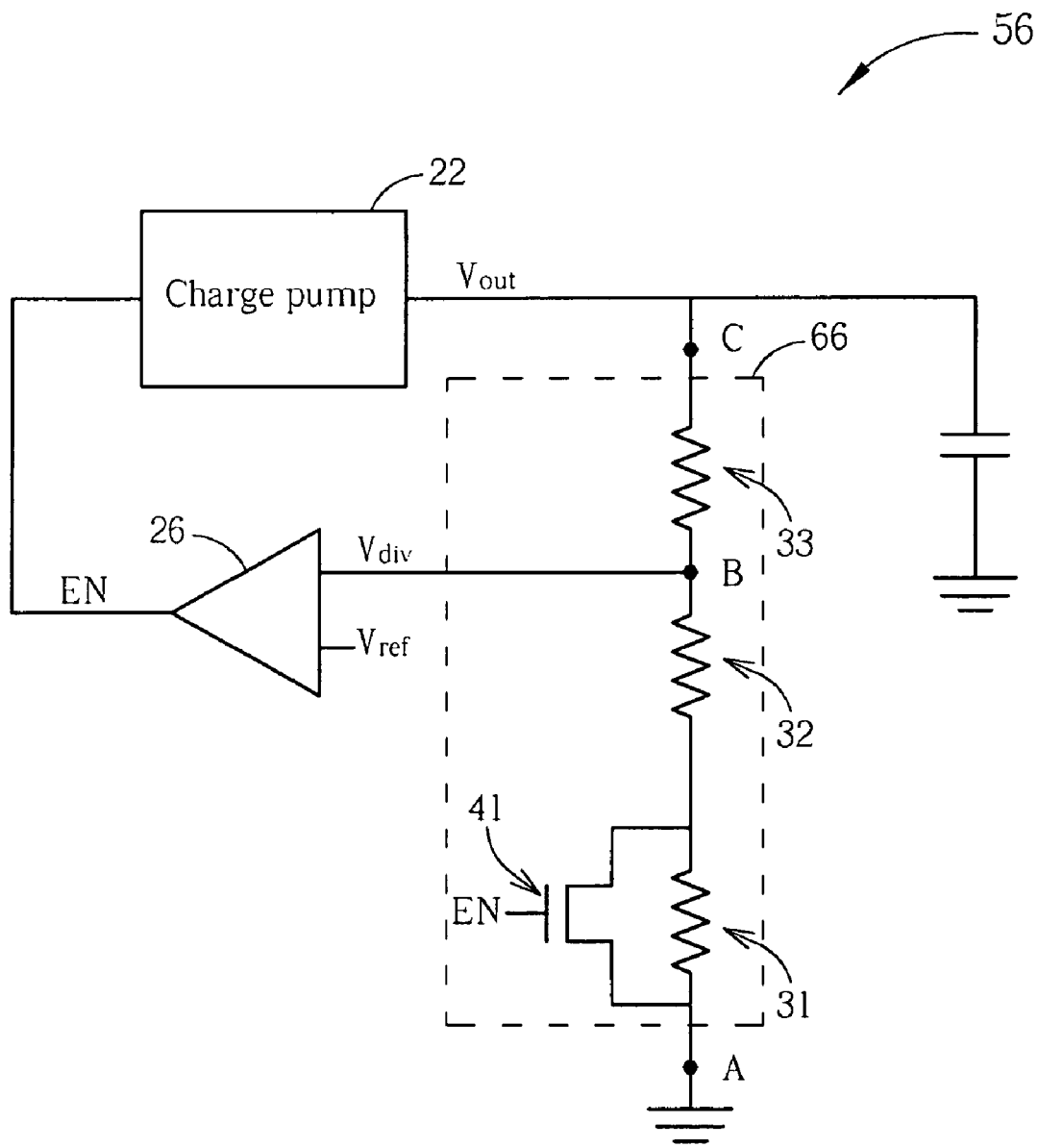
FIG. 9 is a schematic diagram of the sixth embodiment of the voltage generator according to the present invention.

Please refer to FIG. 9. FIG. 9 is a schematic diagram of the sixth embodiment of the voltage generator according to the present invention. In comparison to the fifth embodiment, for the voltage generator 56 in the sixth embodiment, the first node A is coupled to the ground end, the second node B is coupled to the first input end of the comparator 26, and the third node C is coupled to the output end of the charge pump 22. Assuming the resistances of the first resistor 31, second resistor 32, and third resistor 33 are R1, R2, and R3 respectively, the voltage Vdiv is about (R1+R2)*Vout/(R3+R2+R1)=Vout/3.98>Vdiv>R2*Vout/(R2+R3)=Vout/4.02.

Figure 10:
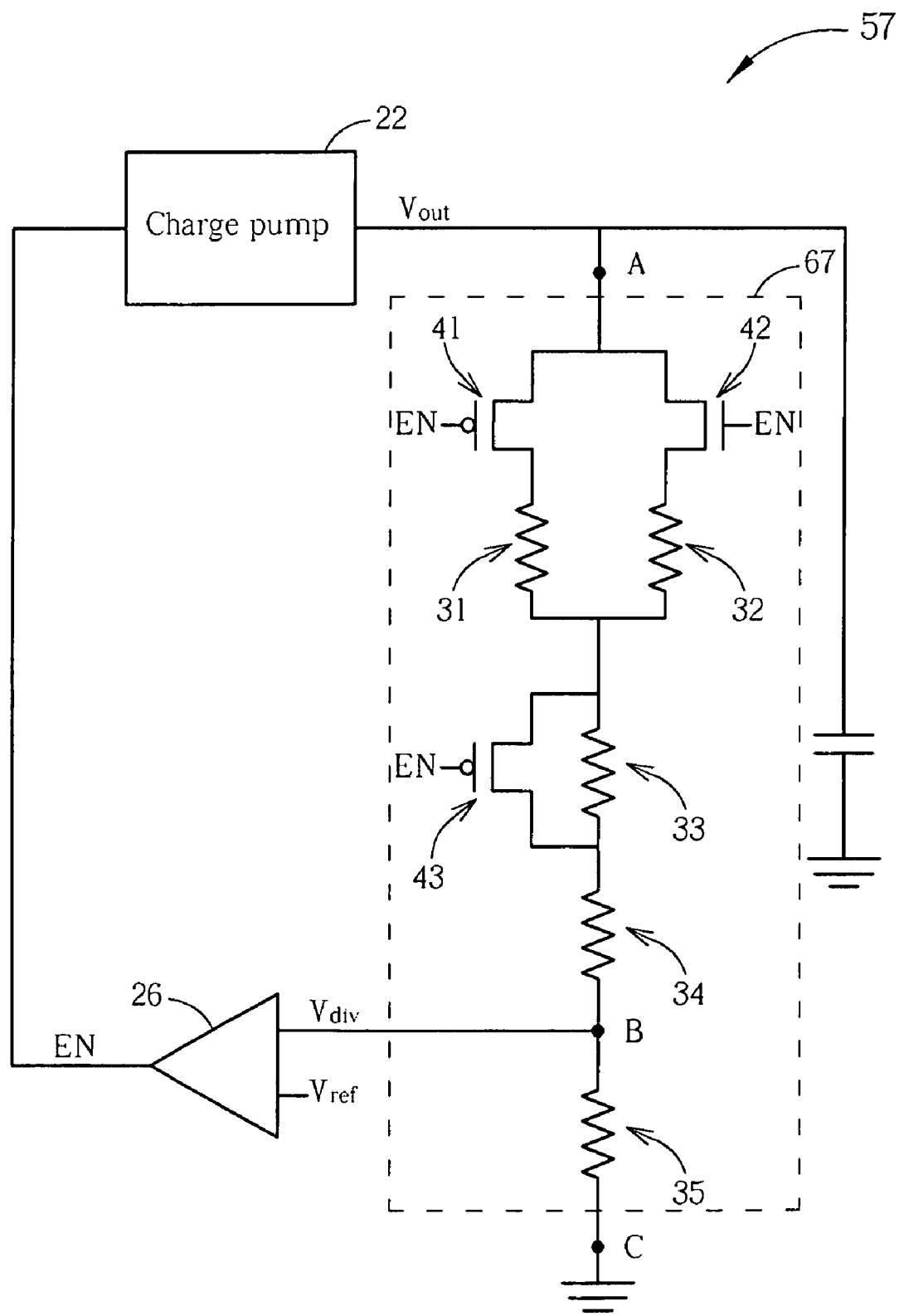
FIG. 10 is a schematic diagram of the seventh embodiment of the voltage generator according to the present invention.

Please refer to FIG. 10. FIG. 10 is a schematic diagram of the seventh embodiment of the voltage generator according to the present invention. In the seventh embodiment, the voltage dividing circuit 67 implements two divided voltages by coupling the resistors in series and in parallel. The first resistor 31 is coupled in series to the first switch 41, and the second resistor 32 is coupled in series to the second switch 42. Then, the series of the first resistor 31 and the first switch 41 is coupled in parallel to the series of the second resistor 32 and the second switch 42. The parallel coupling just mentioned is coupled in series to the third resistor 33 and the fourth resistor 34 between the first node A and second node B. The fifth resistor 35 is coupled between the second node B and the third node C. The third switch 43 is coupled in parallel to the third resistor 33. The first node A is coupled to the output end of the charge pump 22, the second node B is coupled to the first input end of the comparator 26, and the third node C is coupled to the ground end.

Figure 11:
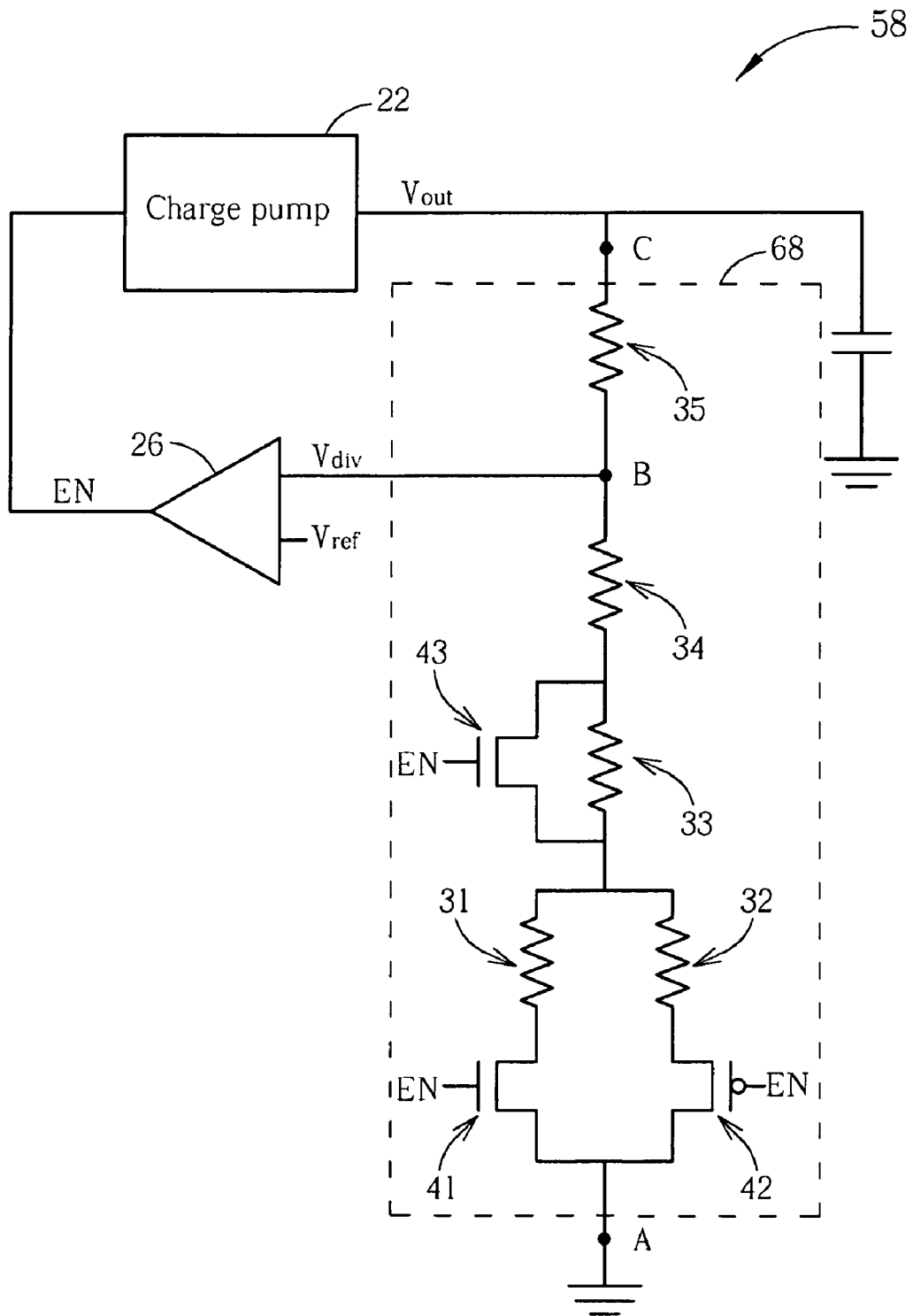
FIG. 11 is a schematic diagram of the eighth embodiment of the voltage generator according to the present invention.

Please refer to FIG. 11. FIG. 11 is a schematic diagram of the eighth embodiment of the voltage generator according to the present invention. In comparison to the seventh embodiment, for the voltage generator 58 in the eight embodiment, the first node A is coupled to the ground end, the second node B is coupled to the first input end of the comparator 26, and the third node C is coupled to the output end of the charge pump 22.

In conclusion, a voltage generator according to the present invention has a dynamic resistors feedback control so as to decrease the ripples of the output voltage of the voltage generator. The voltage generator includes a charge pump, a voltage dividing circuit, and a comparator. The charge pump can output a high voltage. The dividing circuit includes a plurality of resistors and at least one switch. The dividing circuit can generate a first divided voltage of the high voltage when the switch is turned on and a second divided voltage of the high voltage when the switch is turned off. An output signal of the comparator can control the switch and the charge pump. The dividing circuit and the comparator form a feedback loop so that the response speed of the comparator can be increased and the ripple of the high voltage outputted from the charge pump can be decreased.

Those skilled in the art will readily observe that numerous modifications and alterations of the device and method may be made while retaining the teachings of the invention.

What is claimed is:

1. A voltage generator having a dynamic resistors feedback control, the voltage generator comprising:
 a charge pump for outputting a high voltage according to an enabling signal;
 a dividing circuit coupled to an output end of the charge pump and comprising a plurality of resistors and at least one switch controlled by the enabling signal, the dividing circuit for generating a divided voltage of the high voltage according to the at least one switch; and
 a comparator, comprising:
  a first input end coupled to the dividing circuit for receiving the divided voltage;
  a second input end for inputting a reference voltage; and
  an output end coupled to the charge pump for outputting the enabling signal according to the divided voltage and the reference voltage.

2. The voltage generator of claim 1, wherein the dividing circuit comprises:
 a first resistor coupled between a first node and a second node;
 a second resistor coupled between the first node and the second node;
 a third resistor coupled between the second node and a third node; and
 a first switch coupled between the first node and the second node, wherein the first resistor is coupled in series with the first switch.

3. The voltage generator of claim 2, wherein the first node of the dividing circuit is coupled to the output end of the charge pump, the second node is coupled the first input end of the comparator, and the third node is coupled to a ground.

4. The voltage generator of claim 3, wherein the dividing circuit further comprises a second switch coupled between the first node and the second node, and the second switch is coupled in series to the second resistor.

5. The voltage generator of claim 2, wherein the first node of the dividing circuit is coupled to a ground, the second node is coupled to the first input end of the comparator, and the third node is coupled to the output end of the charge pump.

6. The voltage generator of claim 5, wherein the dividing circuit further comprises a second switch coupled between the first node and the second node, and the second switch is coupled in series to the second resistor.

7. The voltage generator of claim 1, wherein the dividing circuit comprises:
 a first resistor coupled between a first node and a second node;
 a second resistor coupled between the first node and the second node, wherein the second resistor is coupled in series with the first resistor;

a third resistor coupled between the second node and a third node; and a first switch coupled in parallel to the first resistor.

8. The voltage generator of claim 7, wherein the first node of the dividing circuit is coupled to the output end of the charge pump, the second node is coupled to the first input end of the comparator, and the third node is coupled to a ground.

9. The voltage generator of claim 8, wherein the dividing circuit further comprises a second switch coupled in series with a fourth resistor, and the series of the second switch and the fourth resistor is coupled in parallel with the second resistor.

10. The voltage generator of claim 9, wherein the dividing circuit further comprises a third switch coupled in series with the second resistor.

11. The voltage generator of claim 7, wherein the first node of the dividing circuit is coupled to a ground, the second node is coupled to the first input end of the comparator, and the third node is coupled to the output end of the charge pump.

12. The voltage generator of claim 11, wherein the dividing circuit further comprises a second switch coupled in series to a fourth resistor, and the series of the second switch and the fourth resistor is coupled in parallel with the second resistor.

13. The voltage generator of claim 12, wherein the dividing circuit further comprises a third switch coupled in series with the second resistor.

14. A method for dynamically controlling feedback mechanism, comprising:

controlling a charge pump to output a high voltage according to a control signal;

dividing the high voltage according to an adjustable divisor;

comparing the divided high voltage and a reference voltage for generating the control signal; and adjusting the adjustable divisor according to the control signal;

wherein the divided high voltage has a first voltage level relative to the high voltage when the adjustable divisor is a first value and has a second voltage level relative to the high voltage when the adjustable divisor is a second value.

15. The method of claim 14, wherein when the divided high voltage is higher than the reference voltage, the control signal controls the charge pump not to output the high voltage and controls the adjustable divisor to be the first value.

16. The method of claim 15, wherein when the divided high voltage is lower than the reference voltage, the control signal controls the charge pump to output the high voltage and controls the adjustable divisor to be the second value, wherein the second value is bigger than the first value.

* * * * *